United States Patent
Gebhard et al.

(10) Patent No.: US 11,073,200 B2
(45) Date of Patent: Jul. 27, 2021

(54) EMBEDDED AUXILIARY OIL SYSTEM FOR GEARBOX PROTECTION

(71) Applicant: Rolls-Royce Corporation, Indianapolis, IN (US)

(72) Inventors: John R. Gebhard, Fishers, IN (US); Adam L. Kempers, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 146 days.

(21) Appl. No.: 16/293,790

(22) Filed: Mar. 6, 2019

(65) Prior Publication Data

US 2020/0284337 A1 Sep. 10, 2020

(51) Int. Cl.
*F16H 57/04* (2010.01)
*F01D 25/20* (2006.01)

(52) U.S. Cl.
CPC ......... *F16H 57/0441* (2013.01); *F01D 25/20* (2013.01); *F16H 57/0423* (2013.01); *F16H 57/0452* (2013.01); *F16H 57/0486* (2013.01); *F05D 2220/32* (2013.01); *F05D 2260/98* (2013.01)

(58) Field of Classification Search
CPC .. F01D 25/20; F05D 2260/98; F05D 2220/32; F16H 57/0441; F16H 57/0452; F16H 57/0486

See application file for complete search history.

(56) References Cited

U.S. PATENT DOCUMENTS

| | | | |
|---|---|---|---|
| 4,538,966 A | 9/1985 | Nikaido | |
| 6,539,912 B1 | 4/2003 | Beer | |
| 2005/0034925 A1 | 2/2005 | Flamang et al. | |
| 2008/0127774 A1 | 6/2008 | Frost | |
| 2010/0294597 A1 | 11/2010 | Parnin | |
| 2013/0319006 A1 | 12/2013 | Parnin et al. | |
| 2014/0076661 A1* | 3/2014 | Xu | F16H 57/045 184/6 |
| 2016/0201568 A1 | 7/2016 | Sheridan et al. | |
| 2016/0245117 A1 | 8/2016 | Parnin et al. | |
| 2016/0376988 A1 | 12/2016 | Sheridan | |
| 2017/0114662 A1 | 4/2017 | Mastro | |
| 2017/0114784 A1 | 4/2017 | Parnin | |
| 2017/0175874 A1 | 6/2017 | Schwarz et al. | |

FOREIGN PATENT DOCUMENTS

| | | |
|---|---|---|
| DE | 197 35 445 A1 | 1/1999 |
| DE | 102006012838 A1 | 11/2006 |
| DE | 102005046514 A1 | 4/2007 |

* cited by examiner

*Primary Examiner* — Jake Cook
(74) *Attorney, Agent, or Firm* — Brinks Gilson & Lione

(57) ABSTRACT

A gearbox is provided for use in a gas turbine engine. The gearbox includes a plurality of gears, a casing surrounding the plurality of gears, and a lubricant re-circulation system. The casing defines a sump positioned beneath the plurality of gears to retain lubricant. The lubricant re-circulation system includes a re-circulation pump, a re-circulation inlet positioned within the sump, and a re-circulation outlet positioned to supply lubricant to the plurality of gears.

14 Claims, 6 Drawing Sheets

EMBEDDED AUXILIARY OIL SYSTEM FOR GEARBOX PROTECTION

TECHNICAL FIELD

This disclosure relates to gearboxes for gas turbine engines, and, in particular to lubrication systems for gearboxes.

BACKGROUND

Gearboxes used in gas turbine engines with multiple gearboxes often have multiple lubrication systems. These lubrication systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a gearbox is provided for use in a gas turbine engine. The gearbox includes multiple gears, a casing surrounding the gears, and a lubricant re-circulation system. The casing defines a sump positioned beneath the plurality of gears to retain lubricant. The lubricant re-circulation system includes a re-circulation pump, a re-circulation inlet positioned within the sump, and a re-circulation outlet positioned to supply lubricant to the plurality of gears.

One interesting feature of the systems and methods described below may be that the lubricant re-circulation system may eliminate the need for a separate secondary oil storage source for the gas turbine engine, reducing the weight of the gas turbine engine.

Another interesting feature of the systems and methods described below may be that the lubricant re-circulation system may reduce the complexity of the gas turbine engine, reducing the number of parts and easing assembly of the gas turbine engine. These advantages may reduce the overall cost of the gas turbine engine.

Another interesting feature of the systems and method described below may be that the lubricant re-circulation system may allow for a smaller primary oil storage source. The smaller primary oil storage source may reduce the weight of the gas turbine engine and allowing easier packaging and placement of the primary oil storage source in the gas turbine engine.

Figure 1:
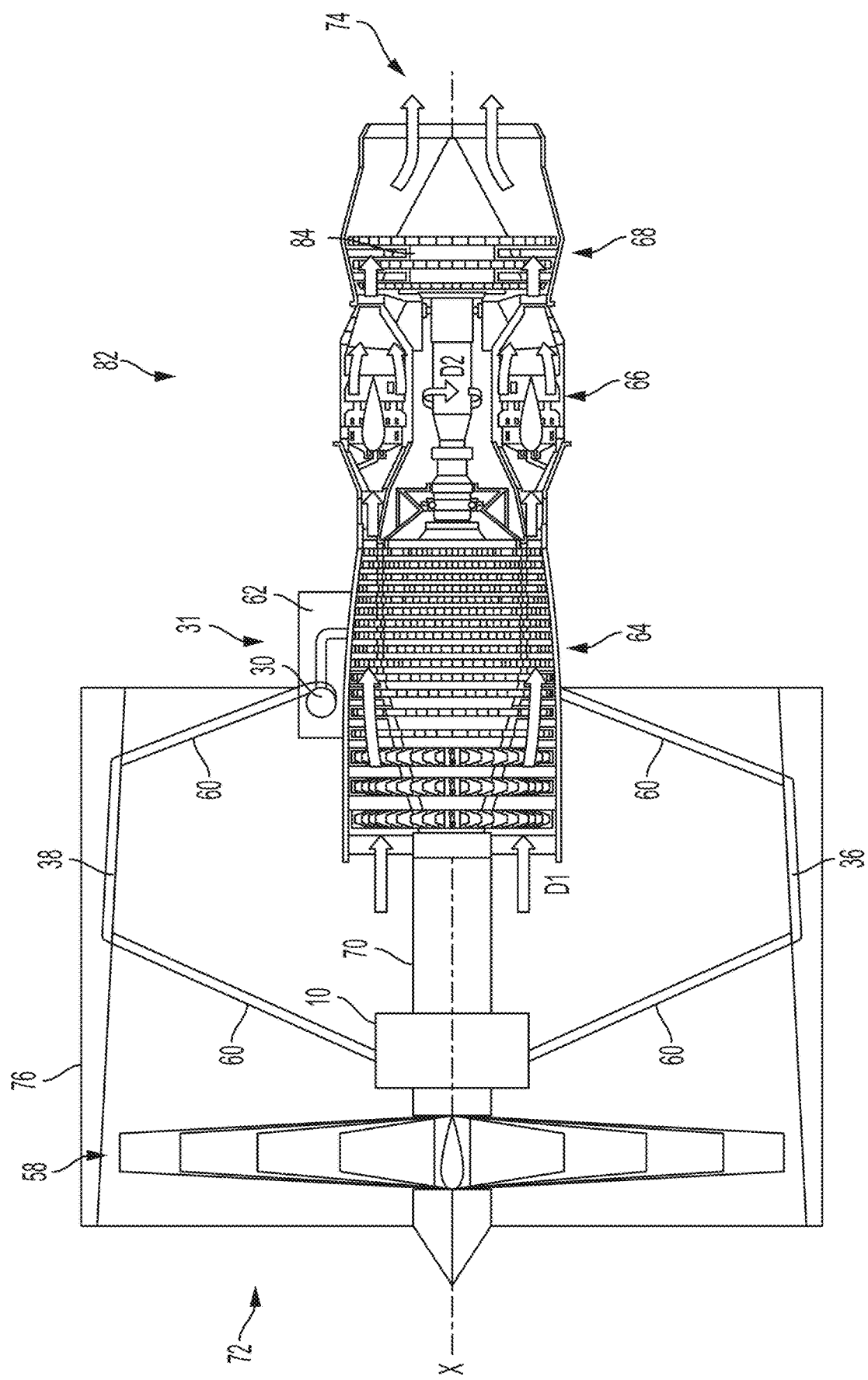
FIG. 1 illustrates a cross-sectional view of an example of a gas turbine engine.

FIG. 1 is a cross-sectional view of a gas turbine engine 82. In some examples, the gas turbine engine 82 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 82 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 82 may take a variety of forms in various embodiments. Though depicted as an axial flow engine, in some forms the gas turbine engine 82 may have multiple spools and/or may be a centrifugal or mixed centrifugal/axial flow engine. In some forms, the gas turbine engine 82 may be a turboprop, a turbofan, a geared turbofan, or a turboshaft engine. Furthermore, the gas turbine engine 82 may be an adaptive cycle and/or variable cycle engine. Other variations are also contemplated.

The gas turbine engine 82 may include an intake section 72, a compressor section 64, a combustion section 66, a turbine section 68, and an exhaust section 74. During operation of the gas turbine engine 82, fluid received from the intake section 72, such as air, travels along the direction D1 and may be compressed within the compressor section 64. The compressed fluid may then be mixed with fuel and the mixture may be burned in the combustion section 66. The combustion section 66 may include any suitable fuel injection and combustion mechanisms. The hot, high pressure fluid may then pass through the turbine section 68 to extract energy from the fluid and cause a shaft 70 of a turbine 84 in the turbine section 68 to rotate, which in turn drives the compressor section 64. Discharge fluid may exit the exhaust section 74.

As noted above, the hot, high pressure fluid passes through the turbine section 68 during operation of the gas turbine engine 82. As the fluid flows through the turbine section 68, the fluid passes between adjacent blades of the turbine 84 causing the shaft 70 to rotate. The rotating turbine 84 may turn a shaft 70 in a rotational direction D2, for example. The shaft 70 may rotate around an axis of rotation, which may correspond to a centerline X of the turbine 84 in some examples.

The gas turbine engine 82 may also include a turbofan 58 upstream from the compressor section 64. The turbofan 58 may receive fluid from the intake section 72 and direct it downstream. A portion of the fluid passing through the turbofan 58 may enter the compressor section 64 while another portion of the fluid may bypass the compressor section 64. To better direct fluid passing through the turbofan 58, the turbofan may be surrounded by a shroud 76. The shroud 76 may be component which encircles the turbofan 58. Examples of the shroud 76 may include a duct or a cylindrical shell. The shroud 76 may extend over other portions of the gas turbine engine 82, such as the compressor section 64.

The turbofan 58 may be coupled to the shaft 70 through a gearbox 10. The gearbox 10 may be any component which mechanically transforms rotations D2 of the shaft 70 into rotations of the turbofan 58. Examples of the gearbox 10 may include a coaxial helical inline gearbox, a bevel helical gearbox, or a planetary gearbox (also known as an epicyclic gear train). The turbofan 58, shroud 76, and gearbox 10, may be supported by struts 60 coupled to different points of the gas turbine engine 82. For example, as illustrated in FIG. 1, the struts may extend between the gearbox 10 and the shroud 76, and between the shroud 75 and the compressor section 64. The struts 60 may extend between other portions of the gas turbine engine 82 as well.

The gearbox 10 may be lubricated by a primary lubrication system 31 including a primary pump 30, a reservoir 62, a primary supply line 38, and a primary return line 36. The primary lubrication system 31 may be any system which circulates lubricant through the gearbox 10. Examples of the primary lubrication system 31 may include a self-contained pump circuit, an isolated pump circuit, or a lossless pump circuit.

The primary pump 30 and reservoir 62 may be coupled to a portion of the gas turbine engine 82. The reservoir 62 may be any space capable of retaining a fluid lubricant, such as a cavity, a tube, or a shell. The reservoir 62 may be coupled to any portion of the gas turbine engine 82, such as the shroud 76, the compressor section 64, or the combustion section 66. The lubricant may be any fluid capable of reducing frictional interaction between mechanical components, such as oil. The lubricant may also be any fluid which cools the mechanical components. The primary pump 30 may draw lubricant from the reservoir 62 to deliver lubricant to the gearbox 10. Examples of the primary pump 30 may include fixed displacement pumps or variable displacement pumps, such as a rotary vane pump, a piston pump, or a centrifugal pump.

The primary pump 30 may deliver lubricant to the gearbox 10 through the primary supply line 38. The primary supply line 38 may be any structure configured to transport lubricant, such as a tube, a pipe, or a vessel. The primary pump 30 may be mechanically linked to the rotation D2 of the shaft 70 of the gas turbine engine 82. Lubricant may return to the primary pump 30 from the gearbox 10 through a primary return line 36. The primary return line 36 may be any structure configured to transport lubricant, such as a tube, a pipe, or a vessel. Both the primary return line 36 and the primary supply line 38 may pass through the struts 60 to be in fluid communication with the reservoir 62 and the gearbox 10.

Figure 2:
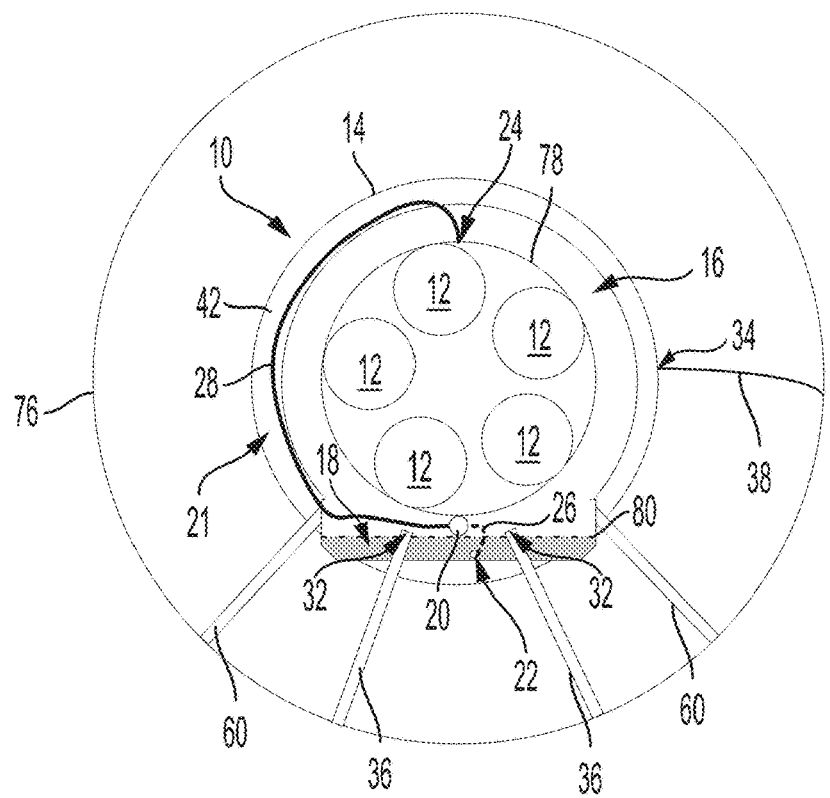
FIG. 2 illustrates a cross-sectional view of a first example of a gearbox.

FIG. 2 illustrates a cross-sectional view of the gearbox 10. The gearbox 10 includes a plurality of gears 12 which rotate in response to the rotation D2 of the shaft 70. The gears 12 may be any object which is capable of mechanically transferring rotation of one component to another component. For example, the gears 12 may transfer the rotation of the shaft 70 to a rotation of the turbofan 58. Examples of the gears 12 may include spur gears, helical gears, or herringbone gears forming a planetary gear train. The plurality of gears 12 may rotate a ring gear 78 which encircles the plurality of gears 12. The ring gear 78 may be any component which, through interaction with the plurality of gears, rotates at a reduced rate compared to the rotation D2 of the shaft 70. Examples of the ring gear 78 may include a spur ring gear, a helical ring gear, or a herringbone ring gear. The ring gear 78 may be included in other embodiments of the gearbox 10, such as those shown in FIGS. 4, 5, and 6.

The gearbox 10 may also include a casing 14 which surrounds the plurality of gears 12. The casing 14 may be any object which encircles the plurality of gears 12 and prevents debris from interacting with the plurality gears 12. Examples of the casing 14 may include a shell, a chamber, or a frame. The casing 14 may have a variety of shapes, such as being circular, cylindrical, or rectangular. The casing 14 may be made of any material capable of protecting the plurality of gears 12, such as titanium, aluminum, or stainless steel. The casing 14 may have an interior which defines a gear chamber 16 and a sump 18. The gear chamber 16 may be any space within the casing in which the plurality of gears 12 may be arranged. Examples of the gear chamber 16 may include a volume, a hold, or a pocket. The sump 18 may be any space within the casing 14 which is spaced apart from and directly beneath the plurality of gears 12, such that any lubricant passing through the plurality of gears 12 would gravitationally descend into the sump 18. Examples of the sump 18 may include a volume, a hold, or a pocket.

The primary supply line 38 may pass through the casing 14 to deliver lubricant to the plurality of gears. The primary supply line 38 may be in fluid communication with the gear chamber 16 through a primary outlet 34. Similarly, the primary return line 36 may pass through the casing 14 to return lubricant to the reservoir 62. The primary return line 36 may be in fluid communication with the gear chamber 16 or the sump 18 through a primary inlet 32. In some embodiments, the primary inlet 32 may be positioned above a bottom surface 86 of the sump 18 such that a minimum lubricant level 80 within the sump 18 may be reached before lubricant enters the primary inlet 32.

The gearbox 10 may also include a secondary lubrication system 21 including a secondary pump 20, a secondary return line 26, and a secondary supply line 28. The secondary lubrication system 21 may be any system which re-circulates lubricant collected in the sump 18 back to the plurality of gears 12. An example of the secondary lubrication system 21 may include a self-contained pump circuit, an isolated pump circuit, or a lossless pump circuit. The secondary lubrication system 21 may be entirely contained within the gearbox 10. The secondary lubrication system 21 may operate independently from the primary lubrication system 31 and may be operational even when the primary lubrication system 31 is inactive.

The secondary pump 20 may be any pump which circulates lubricant within the gearbox 10. Examples of the secondary pump 20 may include fixed displace pumps or variable displacement pumps, such as a rotary vane pump, a piston pump, or a centrifugal pump. The secondary pump 20 may be positioned above the sump 18 such that lubricant within the sump 18 does not interfere with the operation of the secondary pump 20. In other embodiments, the secondary pump 20 may be submerged in the sump 18 below the level of lubricant 80 within the sump 18. The secondary pump 20 may be mechanically linked to the rotation D2 of the shaft 70 of the gas turbine engine 82. For example, as shown in FIG. 2, the secondary pump 20 may be mechanically geared to the ring gear 78 such that rotation D2 of the shaft 70, plurality of gears 12, or ring gear 78, will cause operation of the secondary pump 20.

The secondary pump 20 may draw lubricant from the sump 18 through the secondary return line 26. The secondary return line 26 may be any structure configured to transport lubricant, such as a tube, a pipe, or a vessel. The secondary return line 26 may be in fluid communication with the sump 18 through a secondary inlet 22 positioned at or near the bottom of the sump 18. The secondary inlet 22 may be positioned beneath the primary inlet 32 such that the secondary pump 20 may draw on lubricant before the level of lubricant 80 within the sump 18 reaches the primary inlet 32.

The secondary pump 20 may deliver lubricant to the plurality of gears 12 through the secondary supply line 28. The secondary supply line 28 may be any structure configured to transport lubricant, such as a tube, a pipe, or a vessel. The secondary supply line 28 may extend around the gear chamber 16 through a sidewall 42 of the casing 14, as shown in FIG. 2. The secondary supply line 28 may be in fluid communication with the gear chamber 16 through a secondary outlet 24 positioned above or adjacent to the plurality of gears 12.

Figure 3:
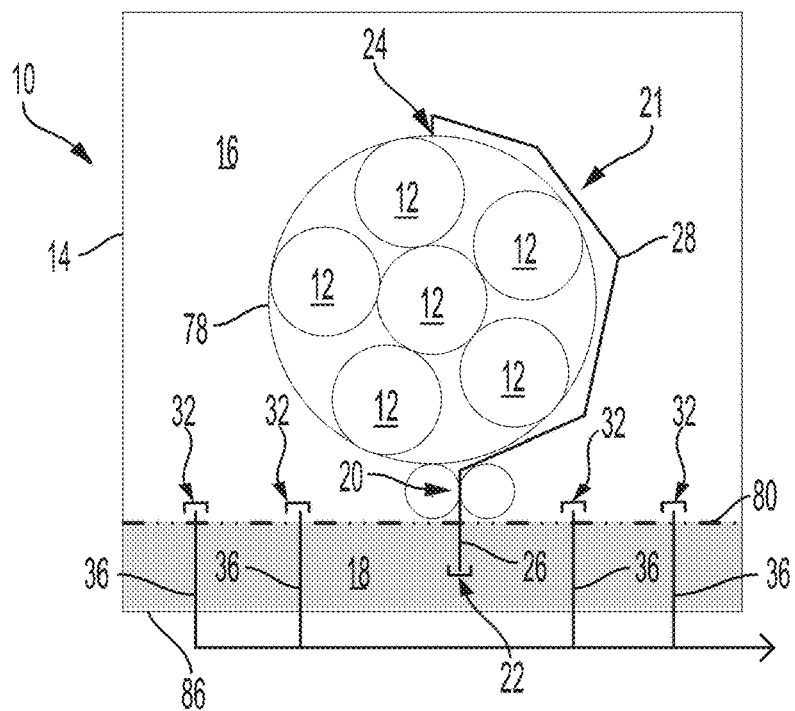
FIG. 3 illustrates a cross-sectional view of a second example of a gearbox.

FIG. 3 illustrates a cross-sectional view of another embodiment of the gearbox 10. In some embodiments, the primary outlet 34 may have a larger cross-sectional area than a cross-sectional area of the secondary outlet 24, such that the primary outlet 34 may introduce more lubricant into the gear chamber 16 than the secondary outlet 24. In some embodiments where the gearbox 10 includes multiple primary outlets 34, the total cross-sectional area of the primary outlets 34 may be greater than the cross-sectional area of the secondary outlet 24.

Additionally, the primary inlet 32 may have a larger cross-sectional area than a cross-sectional area of the secondary inlet 22, such that the primary inlet 32 may drain more lubricant from the gearbox 10 than the secondary inlet 22. In some embodiments where the gearbox 10 includes multiple primary inlets 32, as shown in FIG. 3, the total cross-sectional area of the primary inlets 32 may be greater than the cross-sectional area of the secondary inlet 22. The primary inlet 32 and the primary outlet 34 may have the same cross-sectional area to maintain a constant volume of lubricant within the gearbox 10. Similarly, the secondary inlet 22 and the secondary outlet 24 may have the same cross-sectional area to maintain a constant volume of lubricant within the gearbox 10.

Figure 4:
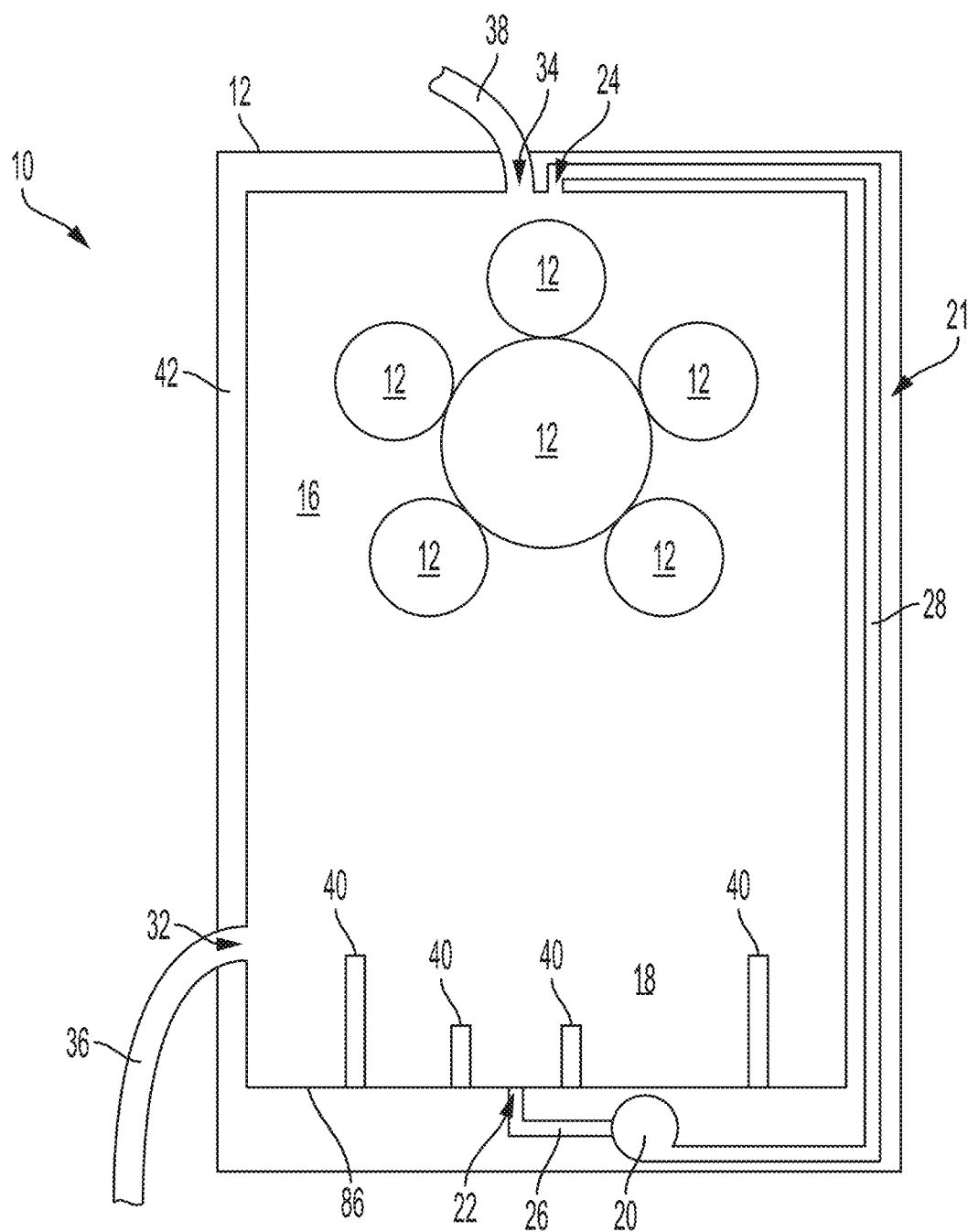
FIG. 4 illustrates a cross-sectional view of a third example of a gearbox.

FIG. 4 illustrates a cross-sectional view of another embodiment of the gearbox 10. In some embodiments, particularly where the gas turbine engine 82 is installed onboard a vehicle such as an aircraft or a ship, the gearbox 10 may pitch and roll according to the movement of the vehicle. In such situations, the sump 18 may be arranged to control movement of lubricant within the sump 18 in order to maintain a constant supply of lubricant to the secondary pump 20 and to prevent lubricant from re-entering the gear chamber 16 from the sump 18. A constant supply of lubricant to the secondary pump 20 may require that the secondary inlet 22 is covered by a standing supply of lubricant at all times to ensure the secondary lubrication system 21 is supplied with oil in the event that the primary lubrication system 31 is no longer functioning.

The sump 18 may be large enough that even when the primary lubrication system 31 is inactive, the sump 18 retains sufficient lubricant that the secondary lubrication system 21 may continue to operate by ensuring a constant supply of lubricant to the secondary inlet 22. However, in some examples, the sump 18 may be as small as possible to minimize the size of the gearbox 10 and prevent the gearbox 10 from occluding the flow D1 of fluid into the compressor section 64. The amount of lubricant within the sump 18 may be minimized to ensure that the plurality of gears 12 within the gear chamber 16 are not adversely affected by being in contact with standing lubricant. Although lubricant may be moving through the plurality of gears 12 at all times, a standing supply of lubricant in the gear chamber 16 may damage the plurality of gears or cause uneven wear on the plurality of gears 12.

In some embodiments, as shown in FIG. 4, the primary inlet 32 may be located on the sidewall 42 of the casing 14 or within the sump 18 between the secondary inlet 22 and the gear chamber 16 to drain any lubricant which may move toward the gear chamber 16 as the gearbox 10 rolls or pitches. The position of the primary inlet 32 within or above the sump 18 may be sufficiently above the secondary inlet 22 to allow the secondary lubrication system 21 to operate effectively. In some embodiments, a plurality of primary inlets 32 may be placed at a uniform elevation above the bottom surface 86 of the sump 18 to define a maximum lubricant level for the sump 18. The bottom surface 86 of the sump 18 may be the lowest surface on the sump 18 or the furthest surface of the sump 18 from the plurality of gears 12. When the gearbox 10 is level, the bottom surface 86 of the sump 18 may be gravitationally directly beneath the plurality of gears 12.

In some embodiments, as shown in FIG. 4, the secondary inlet 22 may be positioned at the bottom surface 86 of the sump 18 to ensure a constant supply of lubricant to the secondary pump 20. Furthermore, to minimize the effects of lubricant flowing away from secondary inlet 22 as a result of rolling or pitching, a baffle 40 may be installed within the sump 18 around the secondary inlet 22. The baffle 40 may be any structure which minimizes the effects of rolling and pitching on the ability of pump 20 to get a quality lubricant supply at inlet 22. In some embodiments, the baffle 40 may extend upwardly from the bottom surface 86 of the sump 18 and may surround the secondary inlet 22. Examples of the baffle 40 may include a wall, a ring, or a projection. The baffle 40 may be rectangular, circular, or any other shape which surrounds the secondary inlet 22 and is capable of containing or directing lubricant. In embodiments having a primary inlet 32 within the sump 18, the primary inlet 32 may be separated from the secondary inlet 22 by the baffle 40.

In some embodiments, as shown in FIG. 4, the sump 18 may include a plurality of baffles 40 spaced apart from one another and each of the plurality of baffles 40 surrounding the secondary inlet 22. The baffles 40 may have a height extending from the bottom surface 86 of the sump 18 which varies according to the distance of the baffle 40 from the secondary inlet 22. For example, baffles 40 closer to the secondary inlet 22 may be shorter than baffles 40 further from the secondary inlet 22, allowing different and layered structures to control the flow of lubricant within the sump 18 and focus the location of the lubricant closer to the secondary inlet 22. The baffles 40 may also include flow mechanisms such as one-way valves or check valves, which allow lubricant to flow through the baffles 40 toward the secondary inlet 22 but prevent the lubricant from flowing through the baffles 40 away from the secondary inlet 22.

In some embodiments the secondary pump 20 may be spaced apart from the plurality of gears 12 and unconnected to them. For example, as shown in FIG. 4, the secondary pump 20 may be contained within the sidewall 42 of the casing 14. Similarly, secondary return line 26 and secondary supply line 28 may also be arranged within the sidewall 42 of the casing 14. In embodiments where the secondary pump 20 is not mechanically connected to the plurality of gears 12, it may still be mechanically linked to the rotation D2 of the shaft 70 by some other mechanism. In other embodiments, the secondary pump 20 may be electrically operated. In embodiments where the secondary pump 20 is not linked to the rotation D2 of the shaft 70, it may be physically located in another area of the engine or another location separate from the engine entirely.

Figure 5:
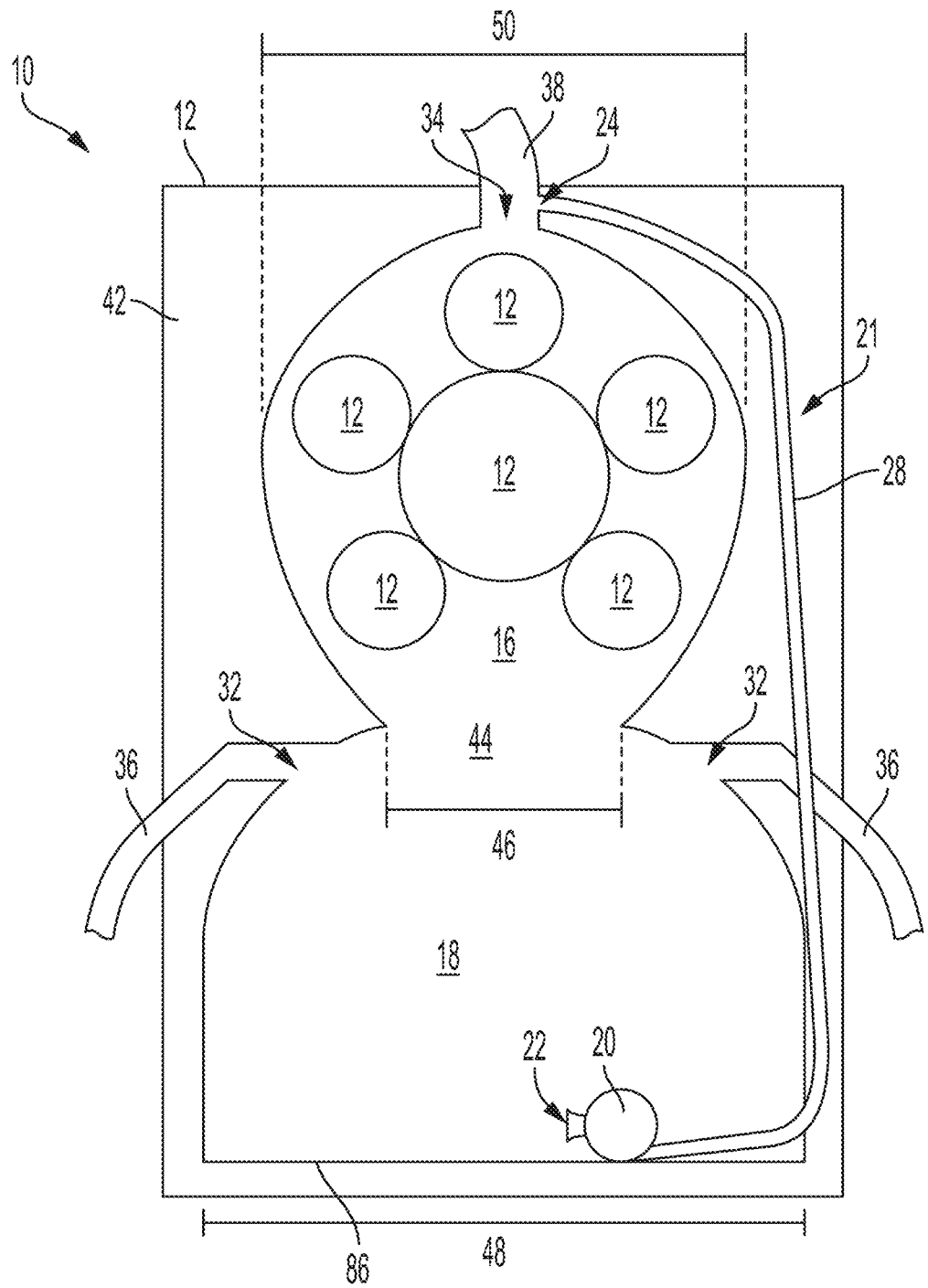
FIG. 5 illustrates a cross-sectional view of a fourth example of a gearbox.

FIG. 5 illustrates a cross-sectional view of another embodiment of the gearbox 10. In some embodiments of the gearbox 10, the sidewall 42 may define a choke point 44 between the gear chamber 16 and the sump 18. The choke point 44 may have a cross-sectional area 46 which is less than a maximum cross-sectional area 50 of the gear chamber 16 such that lubricant passing through the gear chamber 16 collects into the narrow choke point 44 before descending into the sump 18. In embodiments where baffles 40 are present surrounding the secondary inlet 22, as shown in FIG. 4, the choke point 44 may be aligned over the secondary inlet 22.

The cross-sectional area 46 of the choke point 44 may also be smaller than a maximum cross-sectional area 48 of the sump 18. The reduced cross-sectional area 46 of the choke point 44 may prevent lubricant from returning to the gear chamber 16 when the gearbox 10 rolls or pitches and may also direct excess lubricant to the primary inlets.

In some embodiments, such as those shown in FIGS. 2-4, the secondary outlet 24 and the primary outlet 34 may be spaced apart from each other along the sidewall 42 of the casing 14. However, in some embodiments, as shown in FIG. 5, the secondary outlet 24 may be positioned within the primary supply line 38, such that re-circulating lubricant may mix with lubricant being supplied from the reservoir 62 before entering the gear chamber 16.

Figure 6:
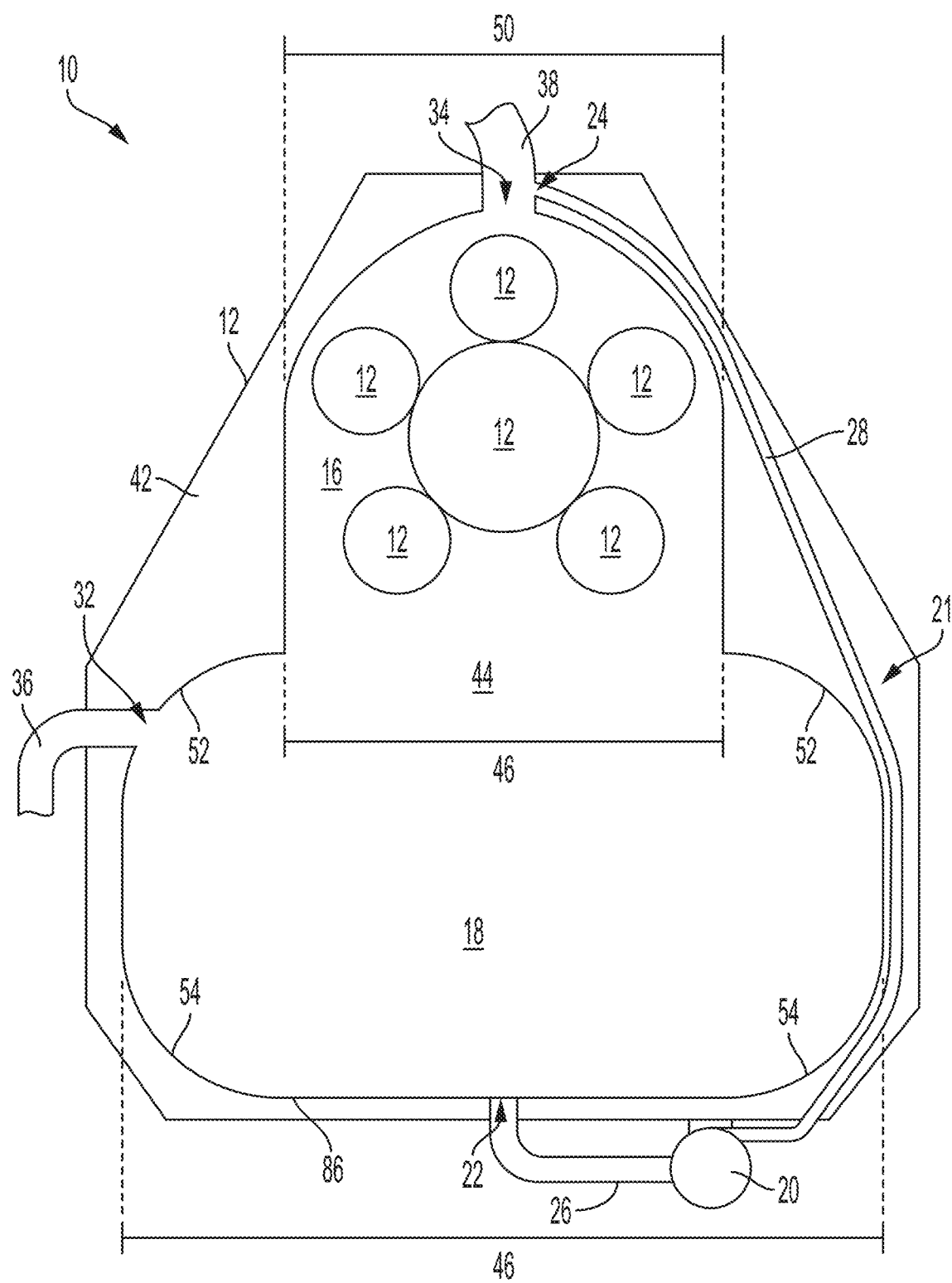
FIG. 6 illustrates a cross-sectional view of a fifth example of a gearbox.

FIG. 6 illustrates a cross-sectional view of another embodiment of the gearbox 10. As shown in FIG. 4, the gearbox 10 may have a variety of shapes to accommodate different shapes for the gear chamber 16 and the sump 18. In some embodiments, the maximum cross-sectional area 50 of the gear chamber 16 and the cross-sectional area 46 of the choke point 44 may be similar. In these embodiments, both the maximum cross-sectional area 50 of the gear chamber 16 and the cross-sectional area 46 of the choke point 44 may be smaller than the maximum cross-sectional area of the sump 18. The wider sump 18 may discourage lubricant from re-entering the gear chamber 16 when the gearbox 10 rolls or pitches. Furthermore, the sump 18 may include curved top surfaces 52 extending from the sidewall 42 to the choke point 44, which may also discourage lubricant from re-entering the gear chamber 16. In some embodiments, the bottom surface 86 of the sump 18 may include curved surfaces 54 extending from the sidewall 42 to the bottom surface 86 of the sump 18 to direct the flow of lubricant within the sump 18 toward the secondary inlet 22 positioned between the curved surfaces 54.

Additionally, in some embodiments, the secondary pump 20 may be coupled to the casing 14 but positioned outside the sidewall 42 of the casing 14. Such an embodiment may allow easy access and repair or replacement of the secondary pump 20.

Figure 7:
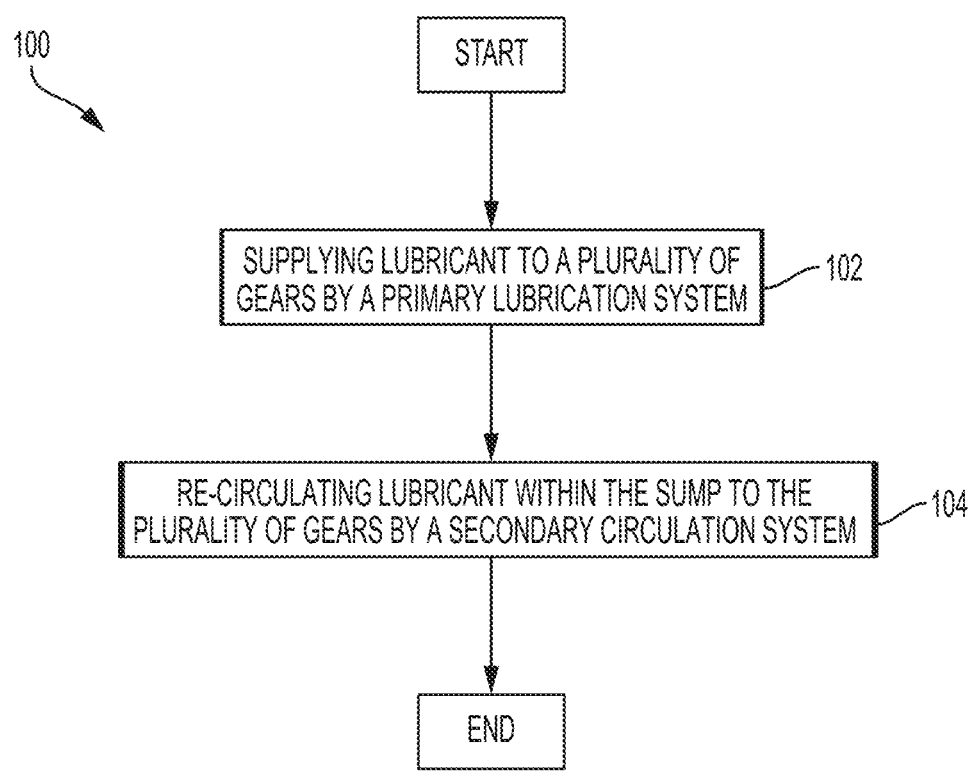
FIG. 7 illustrates a flow diagram of an example of a method of operating a gearbox.

FIG. 7 illustrates a flow diagram of an example of a method of operating a gearbox 10 (100). The steps may include additional, different or fewer operations than illustrated in FIG. 7. The steps may be executed in a different order than illustrated in FIG. 7.

The method (100) may include supplying lubricant to the plurality of gears 12 by the primary lubrication system 31 (102). The primary lubrication system 31 may include the primary pump 30, the reservoir 62, the primary outlet 34 extending through the casing 14, and the primary inlet 32 extending through the casing 14.

The method (100) may further include re-circulating lubricant within the sump 18 to the plurality of gears 12 by the secondary lubrication system 21 (104). The secondary lubrication system 21 may include the secondary pump 20, the secondary inlet 22 positioned within the sump 18, and the secondary outlet 24 positioned above the plurality of gears 12.

The method (100) may be implemented with additional, different, or fewer components. For example, the method (100) may include draining lubricant from the sump 18 through the primary inlet 32. The method (100) may also include restricting flow of lubricant within the sump 18 such that the secondary inlet 22 is always supplied with lubricant. The method (100) may also include preventing the flow of lubricant within the casing 14 from the sump 18 to the plurality of gears 12.

Each component may include additional, different, or fewer components. For example, the baffles 40 may be present in embodiments of the sump 18 shown in FIGS. 2, 3, 5, and 6. Furthermore, the curved surfaces 54 and curved top surfaces 52 may also be included in embodiments shown in FIGS. 2-5.

The logic illustrated in the flow diagram may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a gearbox for use in a gas turbine engine, comprising a plurality of gears; a casing surrounding the plurality of gears, the casing defining a sump positioned beneath the plurality of gears and configured to retain lubricant; and a lubricant re-circulation system comprising a re-circulation pump positioned within the casing, a re-circulation inlet positioned within the sump, and a re-circulation outlet positioned to supply lubricant to the plurality of gears.

A second aspect relates to the gearbox of aspect 1, wherein the casing comprises a primary inlet configured to receive lubricant from the gearbox and deliver lubricant to a reservoir.

A third aspect relates to the gearbox of aspect 2, wherein the primary inlet is positioned between the sump and the plurality of gears.

A fourth aspect relates to the gearbox of any aspects 2 and 3, wherein a cross-sectional area of the primary inlet is greater than a cross-sectional area of re-circulation inlet of the lubricant re-circulation system.

A fifth aspect relates to the gearbox of any of aspects 2-4, wherein the primary inlet is positioned within the sump.

A sixth aspect relates to the gearbox of aspect 5, wherein the primary inlet is separated from the re-circulation inlet of the lubricant re-circulation system by a baffle.

A seventh aspect relates to the gearbox of any of aspects 2-6, wherein the casing comprises a primary outlet configured to supply lubricant from the reservoir to the gearbox.

An eighth aspect relates to the gearbox of any preceding aspect, wherein the casing defines a choke point between the sump and the plurality of gears, wherein a maximum cross-sectional area of the sump is greater than a cross-sectional area of the choke point.

A ninth aspect relates to the gearbox of any preceding aspect, wherein the re-circulation pump is positioned within the sump.

A tenth aspect relates to the gearbox of any of aspects 1-8, wherein the re-circulation pump is positioned within a sidewall of the casing.

An eleventh aspect relates to a lubrication system for a gas turbine engine comprising a plurality of gears; a casing surrounding the plurality of gears, the casing defining a sump positioned beneath the plurality of gears; a primary lubrication system comprising a reservoir separated from the casing, a primary pump configured to deliver lubricant from the reservoir through a primary supply line having a primary inlet extending through the casing, and a primary return line configured to return lubricant from the casing to the reservoir, the primary return line having a primary outlet extending through the casing; and a secondary lubrication system comprising a secondary pump, a secondary supply line having a secondary inlet in fluid communication with the sump, and a secondary return line having a secondary outlet positioned to supply lubricant the plurality of gears.

A twelfth aspect relates to the gearbox of aspect 11, wherein the primary inlet is positioned closer to the plurality of gears than the secondary inlet.

A thirteenth aspect relates to the gearbox of aspect 12, wherein the primary inlet is sized and positioned such that lubricant within the sump may not cross the primary inlet to reach the plurality of gears.

A fourteenth aspect relates to the gearbox of any aspects 11-13, wherein the secondary pump is mechanically linked to rotation of a shaft of the gas turbine engine.

A fifteenth aspect relates to the gearbox of aspect 14, wherein the primary pump is mechanically linked to rotation of the shaft of the gas turbine engine.

A sixteenth aspect relates to a method of operating a gearbox, comprising supplying lubricant to a plurality of gears by a primary lubrication system, wherein the plurality of gears are contained within a casing, wherein the primary lubrication system comprises a primary pump, a reservoir positioned outside of the casing, a primary outlet extending through the casing, and a primary inlet extending through the casing, wherein the casing defines a sump positioned beneath the plurality of gears, and wherein the sump is configured to retain lubricant; and re-circulating lubricant within the sump to the plurality of gears by a secondary lubrication system comprising a secondary pump, a secondary inlet positioned within the sump, and a secondary outlet positioned to supply lubricant the plurality of gears.

A seventeenth aspect relates to aspect 16, further comprising draining lubricant from the sump through the primary inlet of the primary lubrication system.

An eighteenth aspect relates to any of aspects 16 and 17, further comprising restricting flow of lubricant within the sump such that the secondary inlet is always supplied with lubricant.

A nineteenth aspect relates to aspect 18, wherein the flow of lubricant within the sump is restricted by a baffle extending inwardly from a bottom surface of the sump.

A twentieth aspect relates to any of aspects 16-19, further comprising preventing flow of lubricant within the casing from the sump to the plurality of gears.

What is claimed is:

1. A lubrication system for a gas turbine engine comprising:
   a gearbox comprising:
      a plurality of gears; and
      a casing surrounding the plurality of gears, the casing defining a sump positioned beneath the plurality of gears;
   a primary lubrication system comprising:
      a reservoir separated from the casing,
      a primary pump configured to deliver lubricant from the reservoir to the plurality of gears through a primary supply line extending through the casing, and
      a primary return line extending through the casing, the primary return line configured to return lubricant from the plurality of gears to the reservoir; and
   a secondary lubrication system comprising a secondary pump, a secondary supply line, and a secondary return line, the secondary lubrication system contained entirely within the gearbox, wherein:
      the secondary pump is configured to:
         deliver lubricant to the plurality of gears through the secondary supply line, and
         draw lubricant from the sump through the secondary return line.

2. The lubrication system of claim 1, wherein the primary return line comprises a primary inlet positioned closer to the plurality of gears than a secondary inlet of the secondary return line.

3. The lubrication system of claim 2, wherein the primary inlet is sized and positioned such that lubricant within the sump may not cross the primary inlet to reach the plurality of gears.

4. The lubrication system of claim 1, wherein the secondary pump is mechanically linked to rotation of a shaft of the gas turbine engine.

5. The lubrication system of claim 4, wherein the primary pump is mechanically linked to rotation of the shaft of the gas turbine engine.

6. The lubrication system of claim 1, wherein the primary return line comprises a primary inlet configured to receive lubricant from a chamber within the casing in which the plurality of gears is arranged.

7. The lubrication system of claim 6, wherein the primary inlet is positioned between the sump and the plurality of gears.

8. The lubrication system of claim 6, wherein a cross-sectional area of the primary inlet is greater than a cross-sectional area of a secondary inlet of the secondary return line.

9. The lubrication system of claim 6, wherein the primary inlet is positioned within the sump.

10. The lubrication system of claim 9, wherein the primary inlet is separated from a secondary inlet of the secondary return line by a baffle.

11. The lubrication system of claim 6, wherein the primary supply line comprises a primary outlet configured to supply lubricant into a chamber within the casing in which the plurality of gears is arranged.

12. The lubrication system of claim 1, wherein the casing defines a choke point between the sump and the plurality of gears, wherein a maximum cross-sectional area of the sump is greater than a cross-sectional area of the choke point.

13. The lubrication system of claim 1, wherein the secondary pump is positioned within the sump.

14. The lubrication system of claim 1, wherein the secondary pump is positioned within a sidewall of the casing.

* * * * *